Oct. 3, 1933.    J. D. PUGH    1,929,004
EXCAVATOR
Filed July 26, 1929    9 Sheets-Sheet 1
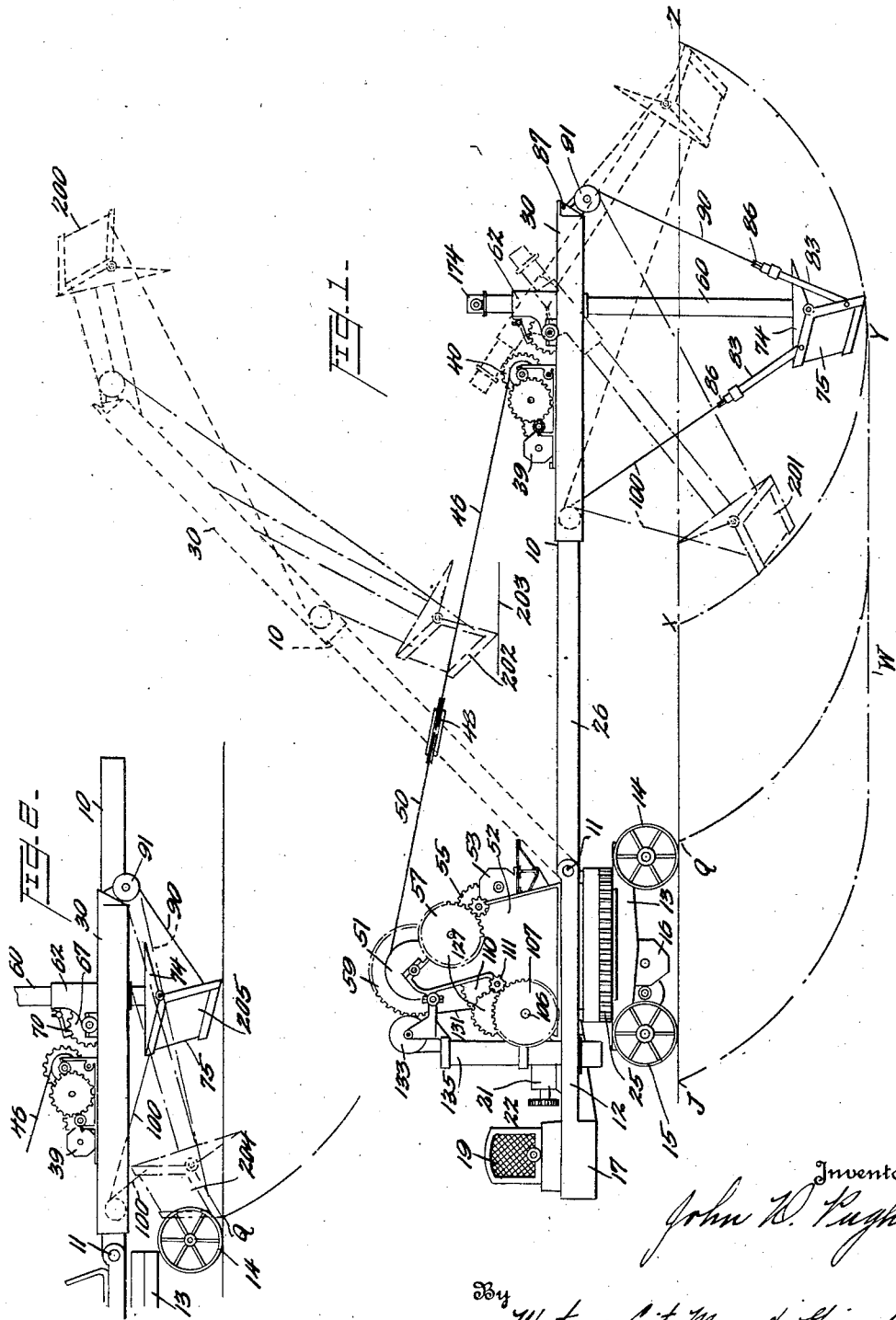
Inventor
John D. Pugh
By Watson, Coit, Morse & Grindle
Attorney

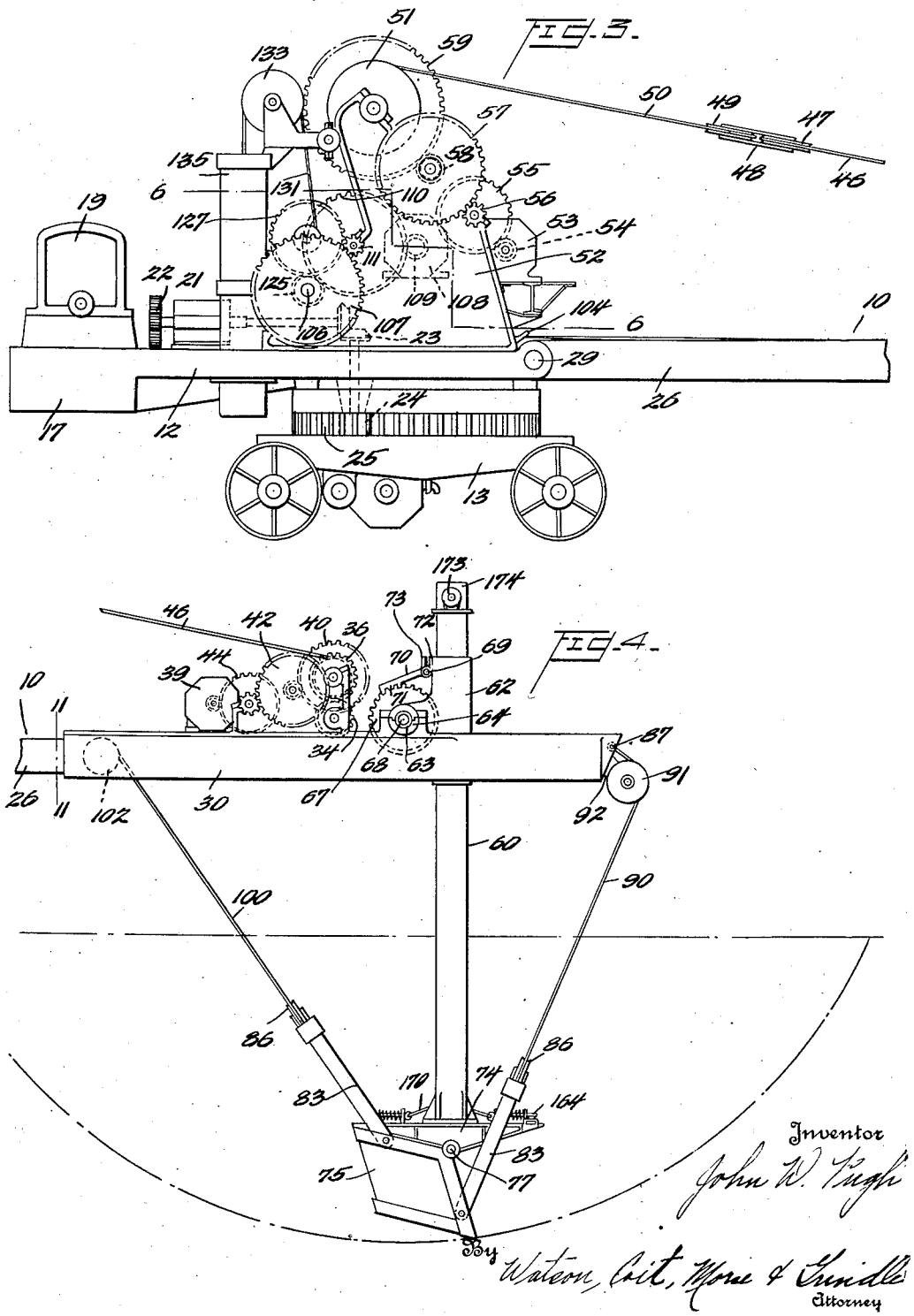

Oct. 3, 1933.          J. D. PUGH          1,929,004
EXCAVATOR
Filed July 26, 1929          9 Sheets-Sheet 3
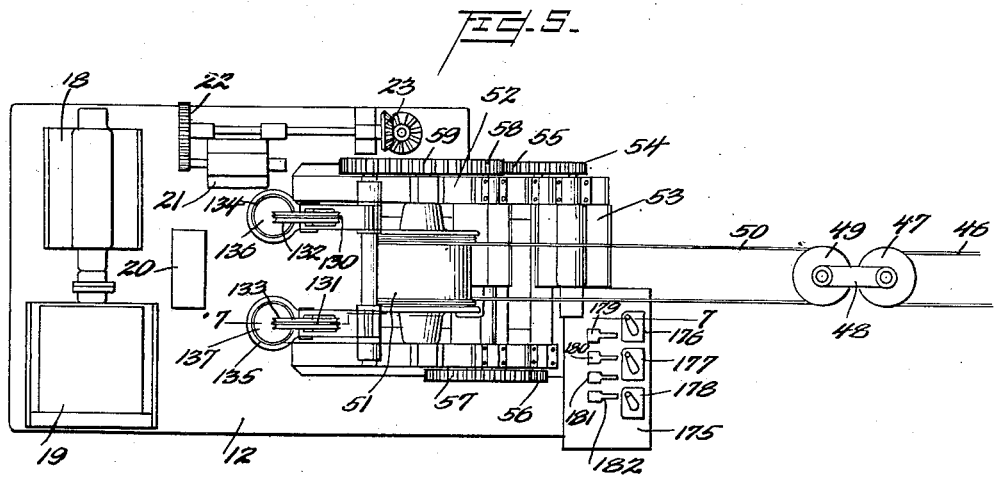
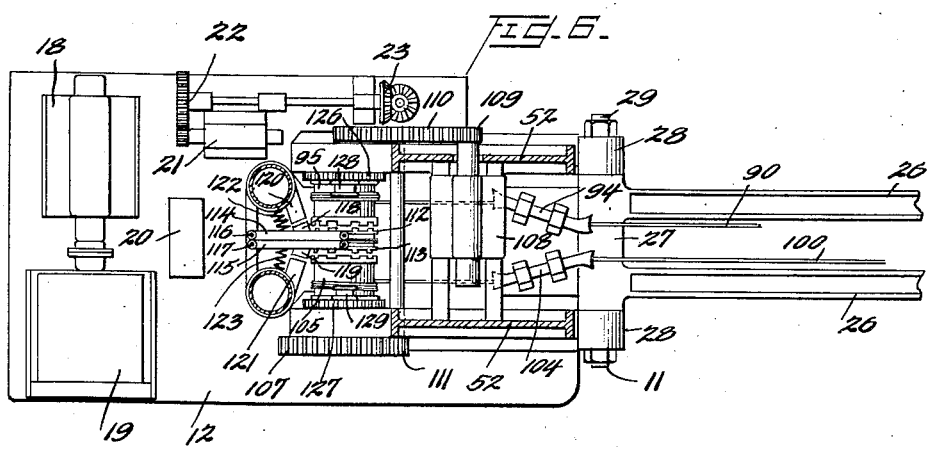
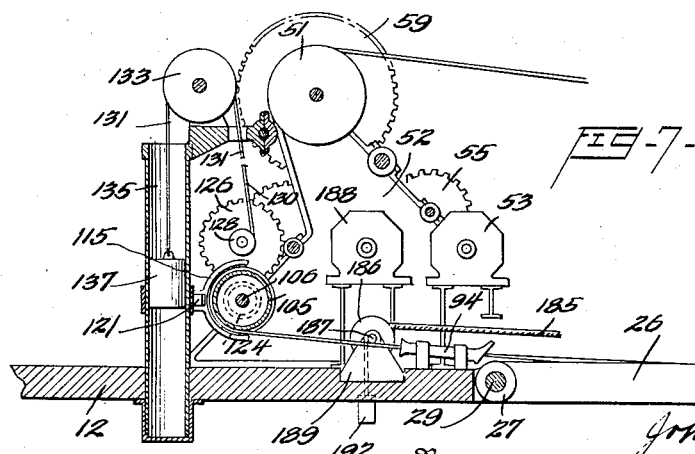

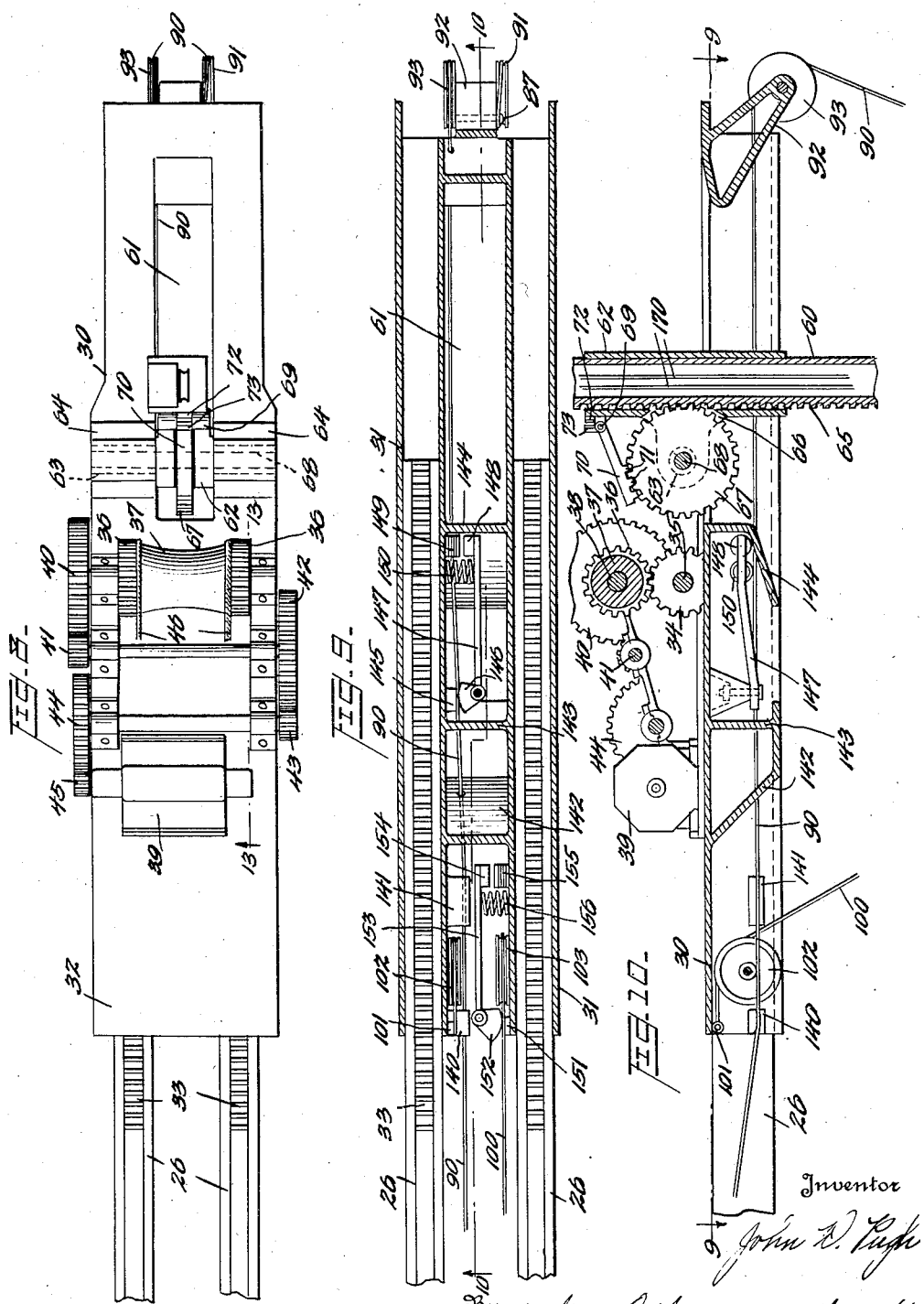

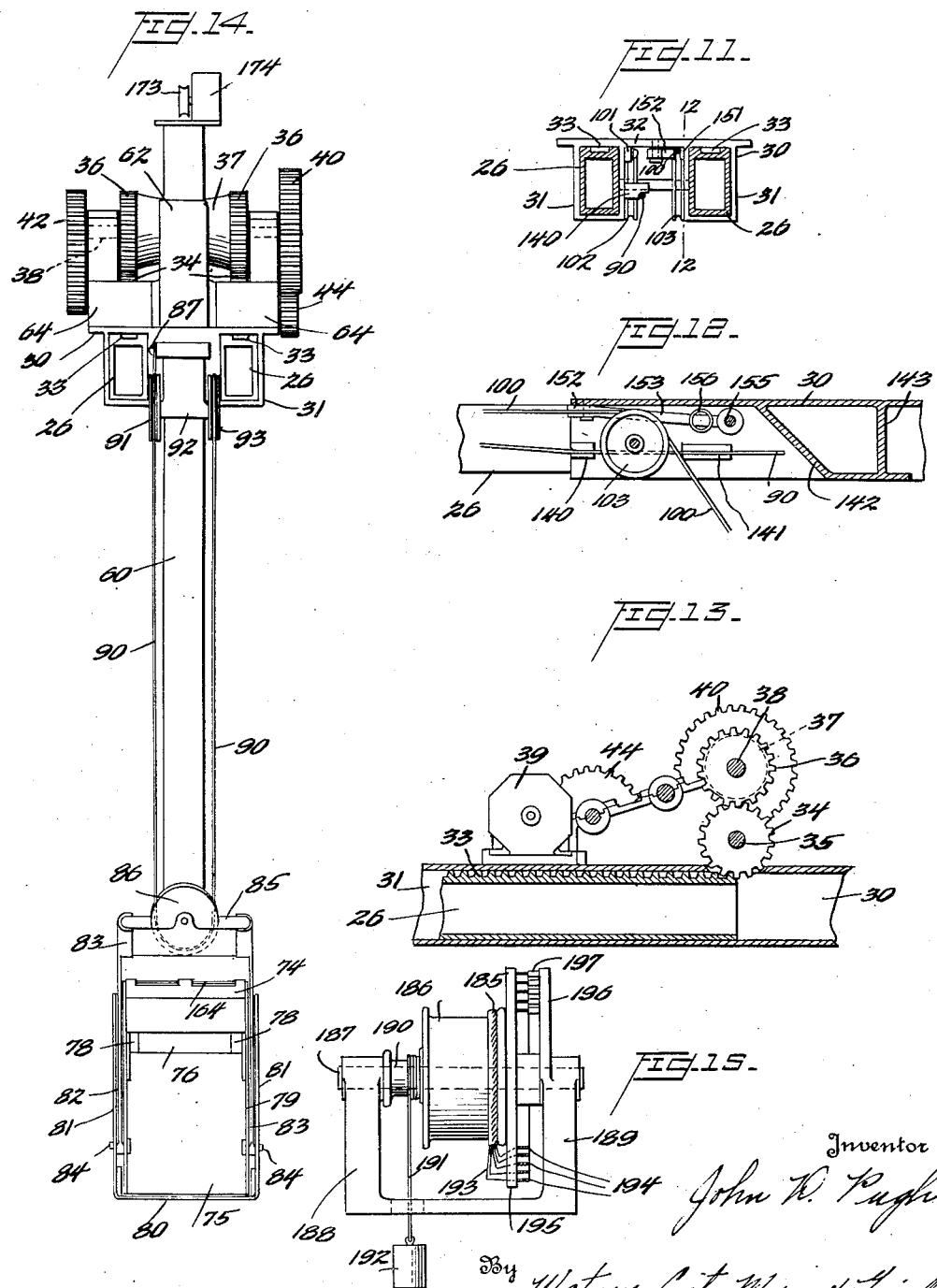

Oct. 3, 1933.  J. D. PUGH  1,929,004
EXCAVATOR
Filed July 26, 1929  9 Sheets-Sheet 6
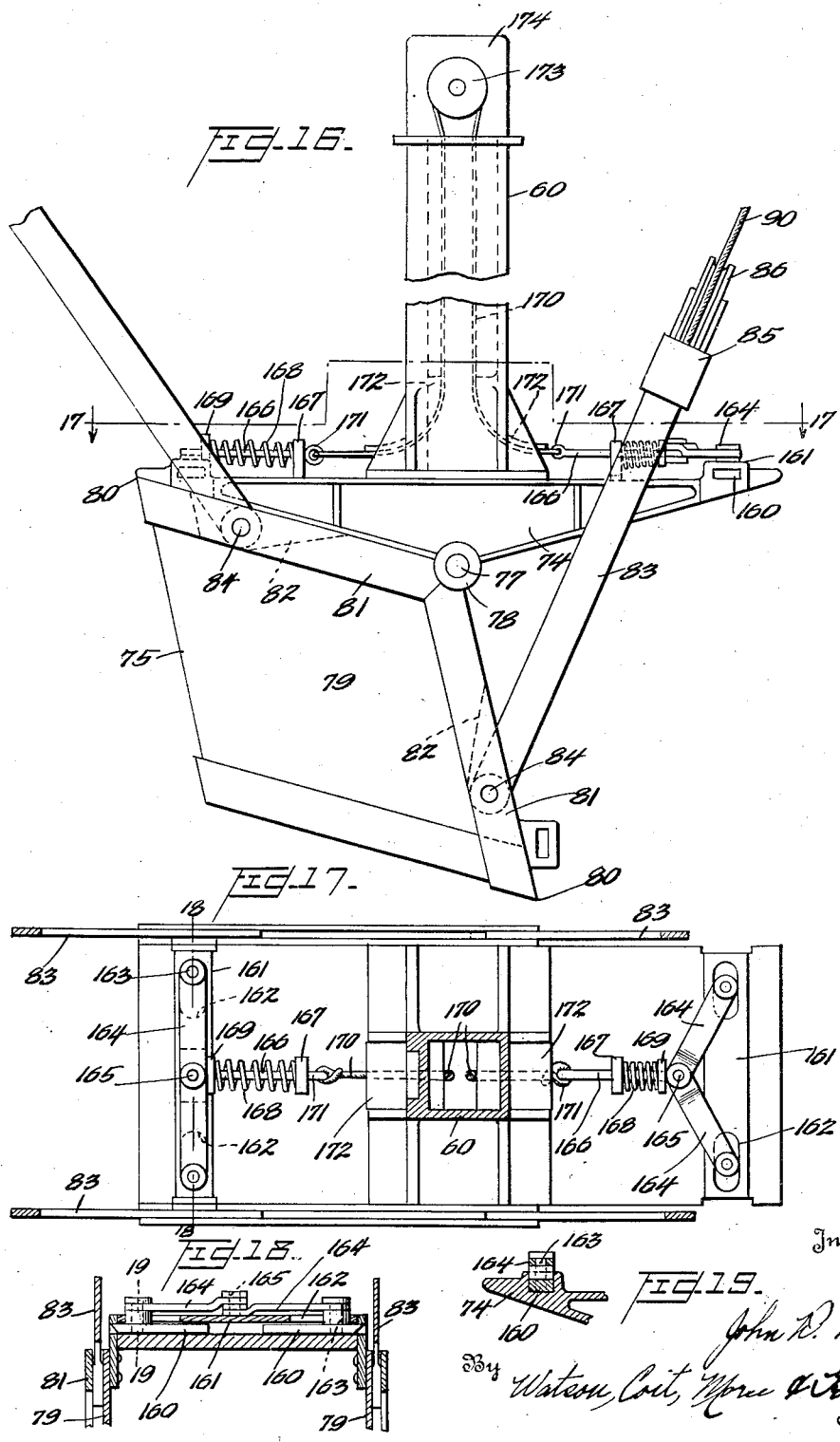
Inventor
John D. Pugh
By Watson, Coit, More & Kindle
Attorney

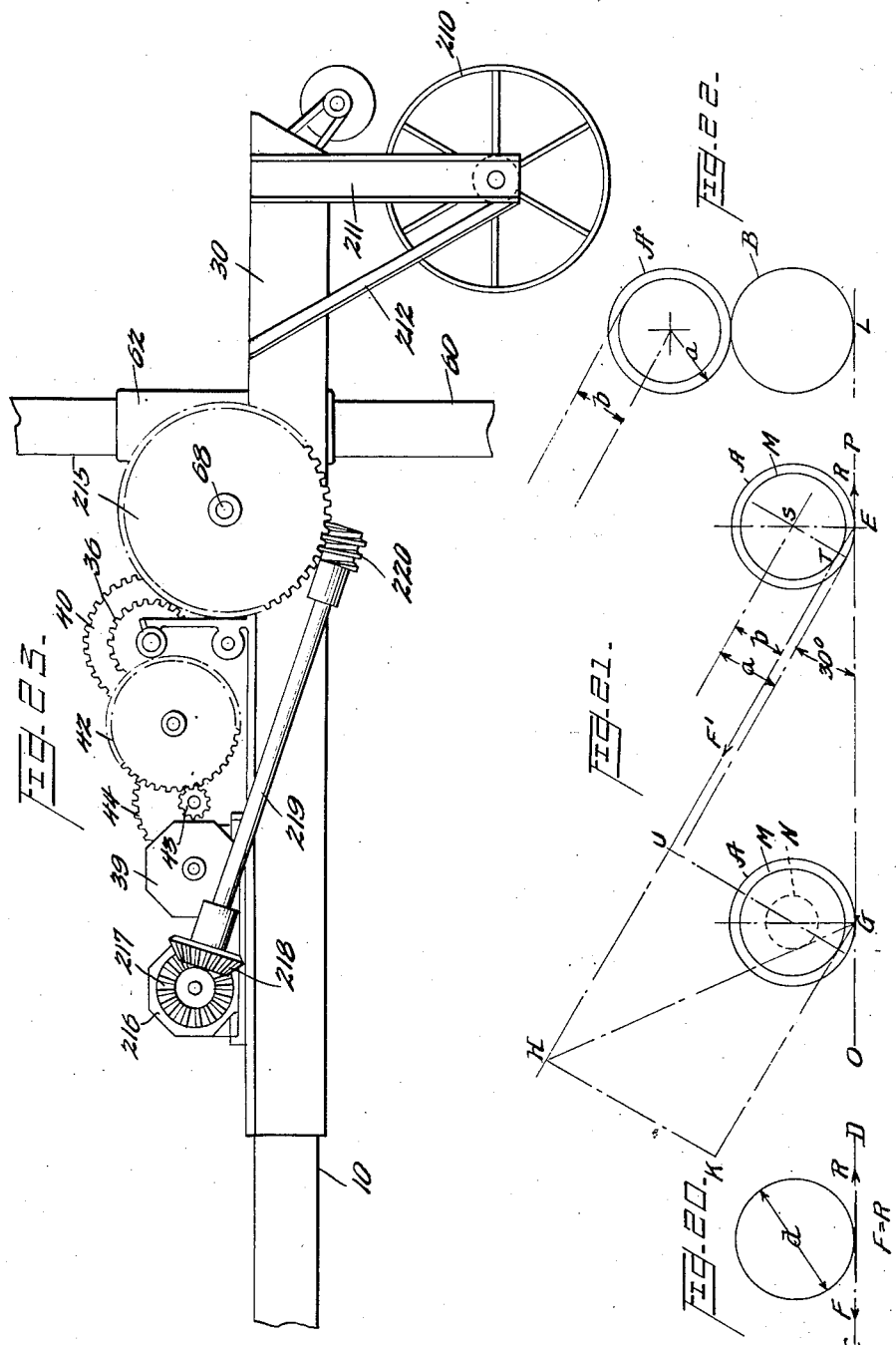

Oct. 3, 1933.     J. D. PUGH     1,929,004
EXCAVATOR
Filed July 26, 1929     9 Sheets-Sheet 8
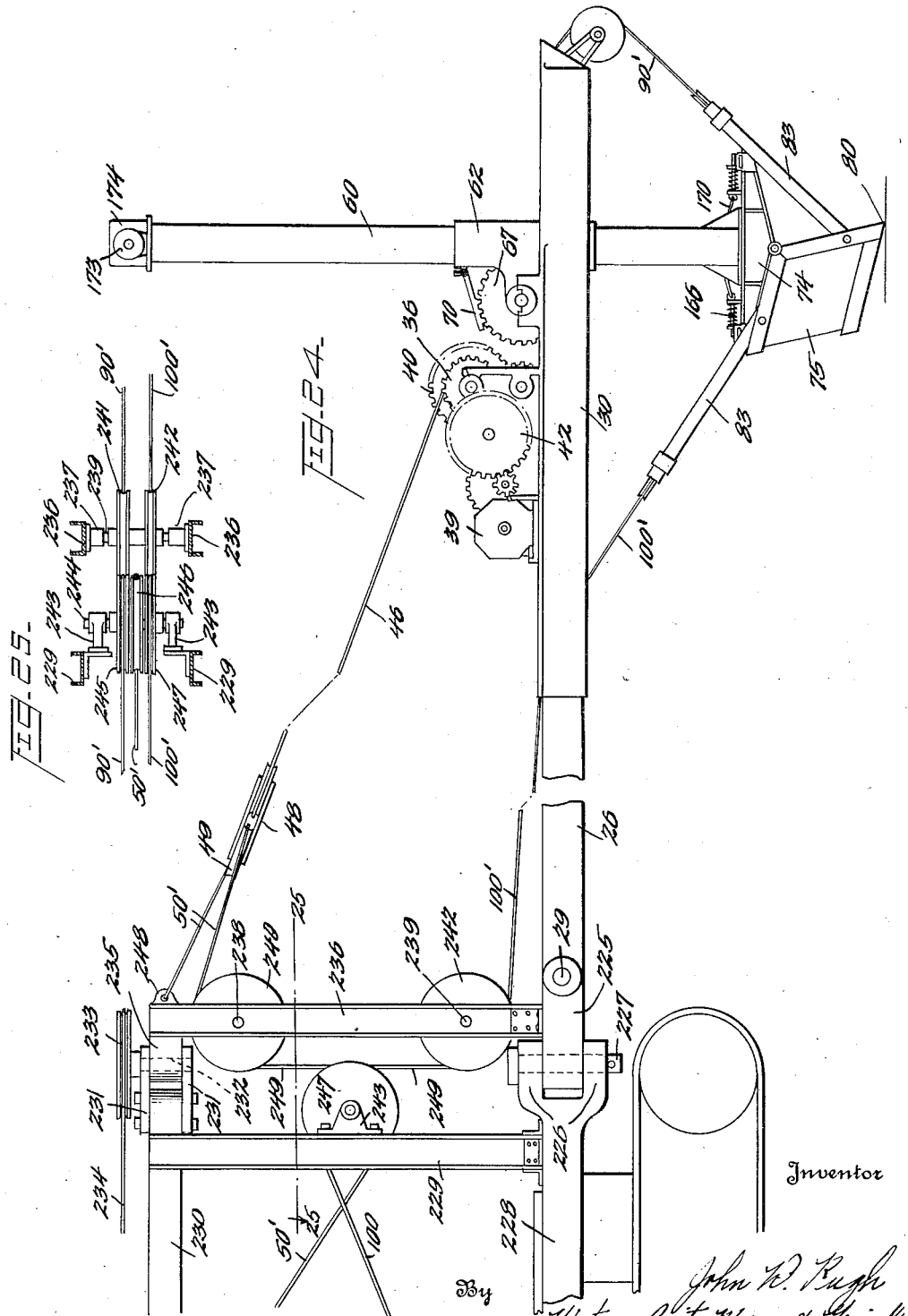
Inventor
John D. Pugh
By Watson, Coit, Morse & Grindle
Attorney

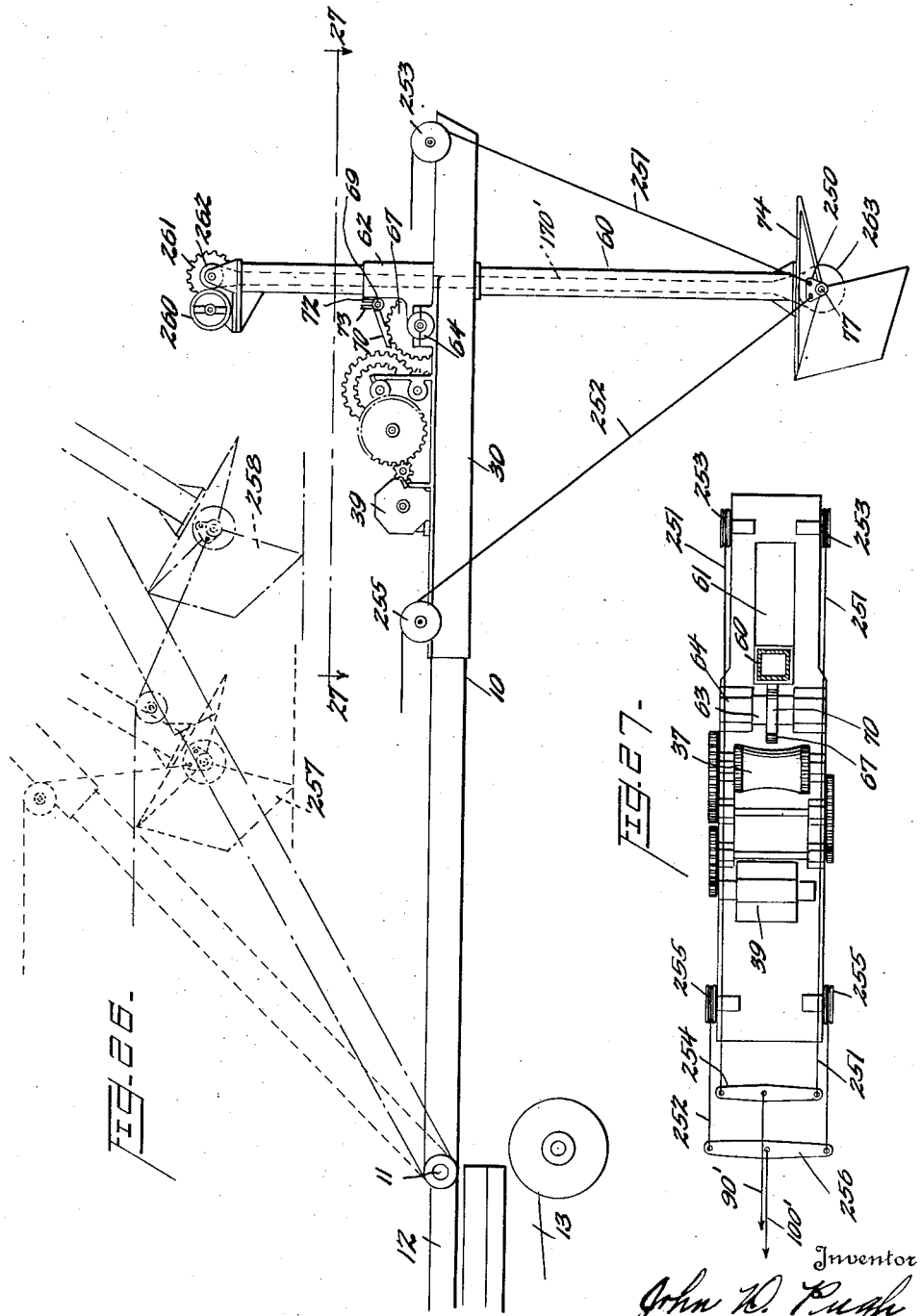

Patented Oct. 3, 1933

1,929,004

UNITED STATES PATENT OFFICE 1,929,004

EXCAVATOR

John D. Pugh, Baltimore, Md.

Application July 26, 1929. Serial No. 381,236

47 Claims. (Cl. 214—134)

This invention relates to cranes or excavators, and more particularly to the type which comprises a base or platform to which is pivoted a boom for supporting and guiding the handle of a bucket or dipper.

The principal object of this invention is to provide an excavator of this general type in which the boom supporting cables are attached to the boom extension and wherein provision is made for retracting and extending the boom extension along the main portion of the boom while maintaining the position of the boom with respect to the base or platform.

Another object of the invention is to provide a boom extension which is capable of being projected beyond the forward end of the main boom for relatively light digging and which can be retracted to the rear of the forward end of the main boom for relatively heavy digging in either horizontal or vertical surfaces of earth. It is obvious that with a boom of fixed length having an ordinary traveler and dipper handle associated therewith, the digging elements cannot be projected beyond the forward end of the boom for digging into a substantially vertical bank of earth when the traveler is retracted to the rearward limit of its movement along the boom, while at the same time reducing the digging radius for relatively heavy diggings. Furthermore, the forward end of such a boom would be interfered with by the vertical bank of earth if the dipper were retracted rearwardly of the boom end.

Another object of this invention is to provide unitary means mounted upon the boom extension for moving the boom extension along the main part of the boom, and for connecting the guy ropes to the boom extension, this means being adapted to maintain a balance between the tension in the guy ropes and the reaction in the boom extension moving means in all positions of said boom extension, so that the extension moving means are operable independently of the tension in the guy ropes.

Another object of this invention is to provide in such an excavator a reversible digging means which is carried by the boom extension and is adapted to cut forwardly or backwardly along an arc of any radius or along a straight line parallel to the boom, and to deliver the excavated material at the end of any forward or rearward cut at a point located at a substantial elevation above the unexcavated ground level.

Another object of the invention is to provide a reversible dipper having separate cutting edges for forward and rearward cutting and which is adapted to be reversed without being detached from the handle and which is provided with a closure adapted to be applied to either one of the cutting openings while the other opening is being used.

The present invention also contemplates the provision of novel means for reversing the dipper or bucket of an excavator of the type described, for latching and unlatching the dipper in its forward and reversing cutting positions, and for swinging the dipper handle forwardly and rearwardly and shortening the effective length thereof for the purpose of taking the various cuts of which the device is capable. The invention also includes the provision of means for locking and releasing the swinging and shortening means for the dipper handle and also novel means for taking up the slack in the aforesaid swinging means.

A further object of this invention is the provision of electrically operated means for accomplishing each movement of the excavating dipper and for controlling each of the above mentioned locking means.

Further objects and features of novelty will be apparent from the following description when read in connection with the accompanying drawings in which several embodiments of the invention are disclosed by way of example:

Figure 1 is a side elevation of one form of the invention showing in broken lines positions of various elements during several of the movements of which the device is capable;

Figure 2 is a fragmentary side elevation of the forward portion of the excavator showing positions of the various parts with the boom extension retracted;

Figure 3 is an enlarged detailed side elevation of the rear half of the excavator as shown in Fig. 1;

Figure 4 is a corresponding view of the forward half of the excavator;

Figure 5 is a plan view of so much of the excavator as is shown in elevation in Fig. 3;

Figure 6 is a horizontal cross-sectional view taken on the line 6—6 of Fig. 3;

Figure 7 is a vertical cross-sectional view taken on the line 7—7 of Fig. 5;

Figure 8 is an enlarged plan view of the boom extension;

Figure 9 is a horizontal, longitudinal cross-sectional view of the boom extension taken on line 9—9 of Fig. 10;

Figure 10 is a vertical, longitudinal cross-sectional view of the same element taken on line 10—10 of Fig. 9;

Figure 11 is a vertical cross-sectional view of the boom and its extension taken on line 11—11 of Fig. 4;

Figure 12 is a vertical, longitudinal cross-sectional view of the same elements taken on line 12—12 of Fig. 11;

Figure 13 is a vertical cross-sectional view of the boom extension operating means taken on the line 13—13 of Fig. 8;

Figure 14 is an end view of the boom and its attached excavating element as seen from the right of Fig. 4;

Figure 15 is a view in rear elevation of the winding drum for the electric cable furnishing current for the operation of the several electrically operated devices on the boom;

Figure 16 is an enlarged side elevation of the dipper or excavator bucket with part of the handle broken away;

Figure 17 is a horizontal, sectional view taken on line 17—17 of Fig. 16;

Figure 18 is a fragmentary, sectional view of a part of the dipper taken on line 18—18 of Fig. 17 showing the latching means;

Figure 19 is a fragmentary, sectional view taken on the line 19—19 of Fig. 18;

Figures 20, 21, and 22 are diagrams showing the development of the means for maintaining the level of the boom while extending and retracting the boom extension;

Figure 23 is a side elevation of a modification of the invention;

Figure 24 is a side elevation of another modification;

Figure 25 is a horizontal cross-sectional view taken on line 25—25 of Fig. 24;

Figure 26 is a side elevation of still another modification of the invention; and Figure 27 is a cross-sectional view of the same modification taken on line 27—27 of Fig. 26.

Although the features of novelty of the present invention may be applied to various types of cranes, such as for example, those which have a stationary mast about which the boom may be swung, the particular embodiment illustrated in the accompanying drawings shows the boom, designated generally by the numeral 10, pivoted to the platform of a movable crane mounted upon the wheels or caterpillar treads. In Figure 1, the boom 10 is pivoted to the revolving platform 12 for vertical movement about the pivot 11. The platform 12 carries the necessary machinery for operating the crane and is disposed for horizontal rotation on the carriage or truck 13. Platform 12 is provided with the enlarged weighted portion 17 to counter-balance the weight of the boom 10. The truck 13 is provided with front steering wheels 14 and rear wheels 15 having broad treads to better sustain the weight of the excavator crane when travelling or operating on soft ground. The rear wheels 15 in the preferred form of the device are driven by an electric motor 16, although they may be driven by any known type of propelling mechanism. If desired, each of the wheels 15 may be separately driven through compensating gearing to facilitate steering.

Upon the platform 12 is carried the generator 18 driven by the gasoline engine 19 for the purpose of furnishing current for the various motors used in operating the excavator. For reserve power suitable storage batteries 20 may be provided. It is conceivable that any desired form of operating means such as steam or compressed air may be substituted for the electric motor 16 and certain of the motors to be described later and the device will still be within the scope of the invention as set forth in the appended claims.

For rotating the platform 12 there is provided the motor 21 which is suitably connected by means of gearing 22, 23, and 24 to the ring gear 25 on the truck 13, in a well known manner, as shown to advantage in Figure 3.

The boom 10 comprises the boom proper, consisting of two parallel hollow beams 26 of rectangular cross-section connected at their inner ends by the sleeve 27 as best shown in Figures 6 and 7, and the boom extension 30. The hinge lugs 28 embrace the sleeve 27 and together with the pintle 29 form the pivot for the boom 10. Disposed for longitudinal movement upon the main portion of the boom 10 is the boom extension 30 which includes two hollow beams 31 which are rectangular in cross-section and of sufficient size to enclose the beams 26 of the boom proper for telescopic sliding movement thereon. These beams 31 are connected by a plate 32 which forms the top surface of the boom extension 30 and supports the mechanism for effecting relative movement between the boom proper and the extension.

Formed on or attached to the upper surfaces of the beams 26 are the racks 33 which are adapted to be engaged by the gears 34 mounted on the shaft 35 which is carried by the boom extension. These gears 34 are driven by the gears 36 which are integrally or otherwise rigidly secured to the winding drum 37, one gear being disposed at each end of the drum. The gears 36 and drum 37 are secured upon shaft 38 which is driven by the motor 39 through the reduction gear train composed of members 40, 41, 42, 43, 44, and 45. It will thus be readily seen that actuation of the motor 39 is effective to move the boom extension along the beams 26 and at the same time operate the winding drum 37. To points on the periphery of the drum 37 at either end thereof are attached the ends of the cable 46, the bight of which passes around a sheave 47 of the equalizer 48. Around the sheave 49 of this equalizer is passed the bight of the cable 50, the ends of which are attached to the ends of the winding drum 51 which is journaled in the brackets 52 mounted on the platform 12. This winding drum 51 is operated by the motor 53 through a gear train comprising members 54, 55, 56, 57, 58, and 59 for winding the guy ropes or cables 46, 50 to raise the boom 10.

The function and operation of the rack 33, the gears 34 and 36, and the winding drum 37 as a unitary means for retracting and extending the boom extension 30 while maintaining the level of the boom 10 with respect to the platform 12 will now be described. Referring to Figure 20, it is evident that if a cable is wound around a drum which is attached to a gear of equal pitch diameter $d$ rolling along a toothed rack on the line C—D, any tensile force F applied to the cable along lines C—D will merely produce an opposite reaction R in the rack teeth without effecting rotation of the drum, and that conceivably the drum and gear may be rolled along the rack without being affected by the tension in the cable, the cable wind-up being equal to the travel of the gear and drum.

In Figure 21, the letter A represents the pitch line of the gear and OP the pitch line of the rack. The point of intersection of these pitch lines in an assumed position of the gear shown at the right hand end of this figure is designated E. In this position the guy rope or cable HE makes an angle of 30° with the pitch line of the rack. The vertex of the angle must coincide with the point E to maintain the equilibrium of the rope tension and reaction in the rack. As will be seen from the diagram, if the radius of the pitch circle A of the gear be designated $a$, the radius $e$ of the drum M at the point of tangency with the cable HE will be $a$ multiplied by the cosine of 30° or .866. Also, assuming the reaction R to be the same as in Figure 20 the tension F' in cable HE will be R divided by the cosine of 30°.

As a concrete example, referring to Figure 20, let the diameter of the pitch circle A of the gear equal 14 inches and the horizontal force F and the reaction R in the rack teeth equal 1,000 pounds. Then with the parts of the device in a position shown at the right hand side of Figure 21, the cable tension F' will equal 1,000 divided by .866 or approximately 1,154 pounds. The radius $b$ of the drum at the points of tangency T of line HE will be 7×.866 or about 6.066 inches. Thus to attain equilibrium when the cable is in position HE, the diameter of the drum at the point of tangency T must be 12.133 inches. As a further demonstration of this proposition, if moments are taken about the center S of the gear and drum, the following equations are obtained:—

$$F' \times b = R \times a$$

or, substituting the values:

$$1,154 \times 6.066 = 1,000 \times 7, \text{ or } 7,000 = 7,000$$

Then assuming the gears to be rolled along the rack toward the left for one revolution, while the cable moves from position HE to the parallel position KG, the travel GE of the gear and drum along the rack will equal the circumference of the circle A or about 43.982 inches, while the rope wind up will be UT which will be equal to GE×6.066 or approximately 38.088 inches. This is assuming that the upper point of attachment of the guy rope is at an infinite distance from the drum or else the rope drops from position HE to KG as the drum is moved toward the left, so that the angularity of the rope with respect to the rack remains constant. This of course cannot be, so when the drum is in the position at the left of Figure 21 the guy rope will occupy the position indicated by line HG and will be tangent to a circle N which must be the circumference of the drum at this point of tangency of the guy rope.

If as in Figure 22 a gear $b$ is interposed between the gear A and the rack, and the guy rope passed around the drum so that it is tangent to the upper side of the drum, the principle remains unchanged and the balance of forces is the same.

Applying this demonstration to the devices as illustrated in the other figure of drawing, it will be seen that the diameter of the drum 37 at its ends where the ends of the cable 46 are attached must be equal to the diameter of the pitch circle of the gears 36 multiplied by the cosine of the angle between the cable 46 at this point and the beam 10. Then as the cable winds up on the drum 37 toward its center the diameter of the drum becomes progressively smaller being at any given point equal to the product of the pitch diameter of the gears 36 and the cosine of the angle between the cables and the beam at said point.

Thus it will be seen that although the guying or supporting cables are attached to the movable boom extension, this extension may be moved relative to the boom proper without changing the horizontal position of the boom, and the motor 39 in moving the boom extension is required to overcome only the friction between the boom extension and the boom proper independently of the tension in the supporting cables.

A dipper handle 60 passes through the opening 61 in the boom extension forwardly of the winding drum 37 and its associated mechanism. The dipper handle 60 in this embodiment of the invention is square in cross-section and is mounted for sliding movement within the sleeve 62 which is provided with hollow trunnions 63 adapted to pivot in the bearing 64 on the boom extension. The rear side of the handle 60 is provided with a rack 65. The rear wall of the sleeve 62 is cut away as at 66 and the trunnions 63 are spaced from each other to receive a pinion 67 which meshes with the rack 65 and is mounted upon the shaft 68 which rotates within the hollow trunnion 63 as clearly shown in Figures 8 and 10. Pivoted to the sleeve 62 at 69 is the locking dog or latch 70 which is provided with teeth 71 adapted to engage the teeth of pinion 67 when in its lower or locked position and to be lifted out of engagement therewith by the action of electro-magnet 72 in attracting the rear leg 73 of the latch 70. When the latch is in engagement with the pinion 67, movement of the handle 60 through the sleeve 62 is prevented and only pivotal movement of the sleeve 62 and the handle 60 about the trunnion 63 may be effected. When the magnet 72 is energized, the latch 70 is raised and the handle 60 is free to move bodily through the sleeve 62, and also to pivot about the sleeve trunnions 63.

The lower end of handle 60 is provided with a wing casting 74 which carries the dipper 75. The casting 74 is provided with a bearing 76 within which the dipper pivot pin 77 rotates. At the ends of this pin 77 the bearing 76 is cut away to provide space for the ears 78 of the dipper. The dipper is reversible and its sides 79 are in the form of parallelograms with their acute angles disposed at the digging edges 80 of the dipper. The sides 79 are reinforced along their upper edges as at 81 and spaces 82 are provided between the walls of the dipper and the reinforcing strips to accommodate the bails 83 which are mounted for pivotal movement at 84. These bails 83 are of an inverted U shape, the legs of which are connected by the members 85 within which are carried the sheaves 86.

Attached to the extreme forward end of the boom extension 30 at a point 87 is one end of the forward dipper rope 90. From its point of attachment 87 this rope 90 passes over the pulley 91 mounted at one side of the bracket 92 and around the sheave 86 of the forward dipper bail 83 from whence it returns, and passing over the pulley 93 which is disposed upon the opposite side of bracket 92, the rope 90 continues rearwardly through the boom extension and between the beams 26 of the boom proper to the platform 12. Upon the forward portion of the platform 12 is the rope guide 94 through which the rope 90 passes to be ultimately wound upon the winding drum 95 to which its end is fastened.

The rear dipper rope 100 has its forward end attached to the boom extension at the point 101 as best illustrated in Figures 9 and 10, from whence it passes over pulley 102, around sheave 86 of the rear bail 83, and returning passes over the pulley 103 and rearwardly between beams 26 to its guide 104 and around its winding drum 105.

Both of the winding drums 95 and 105 are loosely mounted upon shaft 106 which is adapted to rotate in bearings mounted on brackets 52 at the lower rear portions thereof. Upon the outer end of shaft 106 is fastened a gear 107 which is driven by motor 108 through a gear train comprising members 109, 110, and 111. Clutch members 112, 113 are slidably mounted and splined upon the middle portion of the shaft 106 for rotation therewith; clutch 112 being adapted to be connected to drum 95 and clutch 113 being adapted to be connected to drum 105. To these clutch members 112, 113 are attached bifurcated operating levers 114 and 115 respectively which are pivoted at 116 and 117. These clutch levers are provided with the armature members 118 and 119 which cooperate with the electro-magnets 120 and 121 to actuate the clutches either singly or simultaneously. Springs 122 and 123 are disposed so as to normally maintain the clutches out of engagement with the drums 95 and 105.

When either or both of the drums 95 and 105 are released from their clutches and allowed to rotate freely upon shaft 106, the weight of the dipper ropes 90 and 100 would cause them to unwind from the drums and become slack. To overcome this the following mechanism is provided to maintain the proper tautness in the ropes. To the outer ends of the drums 95 and 105 are attached gears 124, 125 which mesh with the larger gears 126 and 127. These gears 126 and 127 carry the small drums or pulleys 128 and 129, to which are fastened the ends of ropes or cables 130 and 131 which are adapted to be wound thereon. From the drums 128 and 129 these ropes pass upwardly over the pulleys 132 and 133, and from thence downwardly into the wells 134 and 135 where they are attached to the weights 136 and 137, which are adapted to reciprocate vertically in the wells 134 and 135. The effect of this arrangement is to continually apply to the drums 95 and 105 a wind-up stress approximately equal to the weight of the dipper ropes.

Referring particularly to Figures 9, 10, 11, and 12 there will now be described mechanism for locking the dipper ropes 90 and 100 rigidly to the boom extension 30 in order to prevent oscillation of the dipper handle 60 and its sleeve pivot-member 62 within the pivot bearing 64. In passing rearwardly from the pulley 93 the forward dipper rope 90 is maintained in an approximately straight line by means of guides 140 and 141 and the openings in the webs 142, 143, and 144 of the boom extension. Thus guided the rope 90 is made to pass between the abutment or jaw 145 on the side wall of one of the hollow beams 31 of the boom extension, and the pivoted cam like jaw 146 which is provided with an arm 147. A compression spring 150 normally urges the arm 147 in a direction to effect locking of the rope 90 between the jaws 145 and 146. Upon the end of arm 147 is the armature 148 adapted to be attracted by the electro-magnet 149 to move the arm 147 to release the rope from the clamping action of the jaws. A similar locking device is provided for the dipper rope 100 at a point immediately to the rear of pulley 103 as shown in Figures 9, 11, and 12, and comprises jaws 151 and 152, lever arm 153, armature 154, magnet 155, and spring 156. The windings of magnets 149 and 155 are connected in series with the dipper rope winding motor 108 so that the rope clutches just described are released immediately upon starting the motor and actuated upon stopping of the motor by the force exerted by springs 150 and 156.

To maintain the dipper 75 in either of its cutting positions to which it may be swung about pivot 77, latches 160 are provided which slide in the guides 161 formed in the wing casting 74 near each end thereof. These guides are cut away as at 162 to provide for movement of the pins 163 which connect the latches 160 with the arms of the toggles 164. These arms are pivoted at 165 to rods 166 which pass through stop members 167 mounted on the casting 74 and which carry coil springs 168 which are compressed between the stop members 167 and the spring followers 169 mounted on the rod 166 near the pivot points 165. The latch operating cable 170 is attached at each of its ends to the inner ends 171 of the rods 166 and passes around guides 172 into the interior of the hollow dipper handle 60. The bight of this cable 170 is then passed around pulley 173 which is adapted to be rotated by the reversible motor 174 mounted upon the upper end of the handle 60. It will be readily understood that when it is desired to shift the dipper 75 from one of its cutting positions to the other, the motor 174 is actuated to pull the cable 170 in a direction to break the toggle and withdraw the latches on the side from which the dipper is to be released and to permit one of the springs 168 to set the latches on the other side of the wing casting 74 after the dipper is swung to the opposite position by the proper manipulation of the cables 90 or 100. In either cutting position the wing casting 74 forms a closure for one of the two dipper openings.

Referring to Figure 5, the numeral 175 designates an operator's platform upon which are disposed various controller boxes, switches, and push buttons for operating the motors and clutches. Preferably the hand operated controllers 176, 177, and 178 are provided for controlling the motors 16, 108, and 39 respectively. Foot operated controllers 179, 180, 181, and 182 are provided for controlling the motor 53, clutches 112 and 113, and the motor 21. Various other contacts or controllers may be provided to actuate the rope clutches 146 and 151, the latch 70, and the motor 174.

For the purpose of transmitting current to the electrically operated devices carried by the movable beam extension 30 there is provided a flexible multiple strand cable 185. In order to take up the slack in this cable which is produced when the boom extension is retracted, the inner end of the cable 185 is attached to the drum 186 which is mounted for rotation on a shaft 187 carried by brackets 188 and 189 disposed upon the platform 12 near its forward end. Mounted upon this same shaft 187 and secured to the drum 186 for rotation therewith is the smaller drum 190. A cord 191 is wound upon the drum 190 and has the counter-weight 192 suspended from its end. This counter-weight 192 is adapted to rotate the drums 186 and 190 with just enough force to wind the cable 185 upon the drum 186 to take up the slack in the cable. The several strands 193 of the cable 185 are connected to the collector rings 194 carried by the insulated ring holder 195 which is fixed to the drum 186. Upon the bracket 189 is formed an extension 196 to which are fixed brushes 197 which are connected to the proper controllers on the platform 175 and adapted to contact with the rings 194. By this arrangement it will be seen there is provided an extensible means to transmit the current for operating the devices associated with the boom extension.

Any known or suitable flexible means such as sliding contacts, slack cables or the like may be employed to conduct the electric current from the main cable to the motor 174 on the movable dipper handle.

The operation of the excavator in its embodiment thus far described is as follows: When it is desired to take a cut along the line XYZ in Figure 1, in performing a ditching operation or the like, the boom 10 is made to assume a horizontal position by proper actuation of the winding drum 51, the boom extension 30 is moved to the desired position along the boom, and the handle 60 is locked against longitudinal movement through the pivoted sleeve 62 by permitting the magnetic lock 70 to engage with the gear wheel 67, and also swung rearwardly by winding the rear dipper rope upon the drum 105. Then with both of the dipper rope clutches 146 and 152 and the winding drum clutch 113 released, winding drum clutch 112 is thrown in and the motor 108 started. The forward rope 90 will then be wound upon drum 95 and the dipper handle 60 pulled forwardly about its pivot 63 and the dipper 75 will move along line XYZ. Upon arriving at the point Z at the ground level, this pivotal movement will be stopped, and the boom will be lifted to its position shown in dotted lines in Figure 1 r to any other convenient height for dumping the dipper 75. During this operation, the rope 100 is slack except for the slight pull exerted by counter-weight 137 so that by releasing the rearward pair of dipper latches 160 by actuation of the motor 174 and maintaining tension in the forward rope 90, the dipper will be swung over to its opposite position and its contents dumped.

It will be readily understood that a cut may be taken from Z to X by reversing the operation described above, the position of the dipper at one point during said reverse operation being shown at 201. At the completion of this cut the boom is elevated in the same manner as has been described but with the dipper handle in its rearwardly swung position, in which position the dipper may be dumped as indicated at 202. Due to the increased length of the boom provided by the extension 30, the dipper may be elevated in its rear dumping position to a sufficient height to clear the wall 203 of a car, wagon, motor truck, or a like container for the excavated material. The dumping angle of the bottom of the dipper when in this rearwardly swung and elevated position is approximately 45° with the horizontal which is sufficient to enable the contents to be readily ejected by gravity.

The excavator may be operated to cut along the line QWYZ by starting the arcuate cut just described with the boom extension in a retracted position, the dipper being in the position shown in 204 in Figure 2. Then at the point W where the dipper handle 60 will be substantially vertical, the ropes 90 and 100 are locked by means of the clutches 146 and 152, and the boom extension 30 moved forwardly by means of the mechanism including motor 39, gears 34 and racks 33, until the dipper reaches the point Y where the arcuate movement is resumed and the operation completed as described for taking the cut along line XYZ.

The excavator may also be used for surface grading by raising the dipper to the position shown at 205 in Figure 2 by the simultaneous actuation of the cables 90 and 100, locking the clutches 70, 146 and 152, thus making the dipper and handle rigid with the boom extension, and effecting the grading cut by a substantially horizontal movement of the boom extension alone. This cut may be taken in an opposite direction by reversing the dipper.

The digging movements of the dipper thus far described have been effected with the boom 10 in a horizontal position, but it is apparent that any of these movements may be accomplished with the boom in any convenient position above or below the horizontal.

To support the weight at the outer end of the boom extension a supporting wheel 210 may be provided which may be attached to the boom extension 30 by means of the standards 211 and braces 212, as shown in Figure 23. This figure also illustrates a positively actuated means for moving the dipper handle 60 through the pivoted sleeve 62. This means comprises a gear wheel 215 which is mounted upon the extended end of shaft 68 upon the central portion of which is fixed the gear 67 which cooperates with the rack 65 on the handle 60 as previously described. The gear wheel 215 is driven by motor 216 through bevel gears 217 and 218, shaft 219, and worm 270 all mounted upon the boom extension 30. In this embodiment the latch 70 may be omitted if it is desired to effect forward and rearward pivotal movement of handle 60 about the pivot 63 by means of the ropes 90 and 100 in the usual manner, but the latch 70 may be retained if it is desired to effect both pivotal and longitudinal movement of the handle by means of the gear 215.

In Figures 24 and 25 is shown an embodiment of the invention in which the boom 10 is pivoted to the platform for horizontal movement as well as vertical. In these Figures the beams 26 of the boom are pivotally mounted upon the pintle 29 as in the other embodiment, but here the pintle 29 is carried by the member 225 which is mounted between the jaws 226 for horizontal pivotal movement about the pin 227. Upon the platform 228 slightly rearwardly of the jaws 226 are disposed the spaced uprights 229 which serve to support the horizontal beam 230 of the superstructure of the apparatus. Hinge members 231 are secured to the forward end of this beam and provide bearings for the vertical stub shaft 232, upon the upper end of which is mounted the pulley 233 adapted to be controlled by cable 234. The shaft 232 is disposed directly above the pivot pin 227 and forms a pivot means for the member 235 upon either side of which are secured the upper ends of the uprights 236, the lower ends of which rest upon the member 225. Mounted in bearings 237 on the inner sides of uprights 236 are the shafts 238 and 239. The shaft 238 is disposed near the upper ends of the uprights and carries the sheave 240. The shaft 239 is located near the lower ends of these uprights and carries two sheaves 241, 242. Bearing members 243 are attached to the uprights 229 near their mid points and carry the shaft 244 upon which are mounted the sheaves 245, 246 and 247.

Attached to the securing member 248 on the forward portion of the member 235 is the cable 50' which passes around the sheave 49 of the guy rope equalizer 48 and from thence rearwardly over the sheave 240 and under the middle sheave 246 to the boom operating drum 51. The forward dipper rope 90' in this embodiment passes rearwardly under the sheave 241 and over the sheave 245 to the dipper cable drum 95. The rear dipper rope 100' passes under sheave 242 and over sheave 247 to the dipper cable drum 105. The vertically disposed portions 249 of the cables 50', 90' and 100' are thus made to coincide as nearly as possible with the vertical pivot line passing through the pivots 227 and 232, so that there is no possibility of accidental displacement from their sheaves during lateral swinging of the boom together with the framework comprising the elements 225, 235, and 236. It is to be understood that the platform 228 in this embodiment may be mounted for horizontal rotation on a truck as in the form shown in Figure 1, if so desired.

A further variation in the device is disclosed in Figures 26 and 27 of the drawings. In these figures, the ends of the dipper pivot 77 are extended and are provided with cable attached members 250 for connecting the ends of the pair of forward dipper ropes 251 and the pair of rear dipper ropes 252, one rope of each pair being connected to each member 250. The forward pair of ropes 251 pass over the sheaves 253 and thence rearwardly to be connected to the ends of the equalizer 254, to the center of which is attached a single rope or cable 90', which is operated in a similar manner to rope 90 in the other embodiments. The rear dipper ropes 252 are similarly passed over sheaves 255 and are connected by means of an equalizer 256 to rope 100' corresponding to rope 100 in the previously described forms of the device. Equalizers 254 and 256 are shown in their present forms merely by way of example, and it is to be understood that any form of equalizer may be used to connect the dipper operating ropes within the scope of the appended claims. Through the elimination of the bails 83 in this embodiment, the dipper in its rearward dumping positions shown at 257 and 258 in Figure 26 may be brought much closer to the boom and consequently dumped a higher point or dumped at a point of similar elevation as in the previously described embodiments without moving the boom extension 30 to its outward limit of travel or elevating the boom 10 through such a great angle.

It will be seen that in this embodiment of the invention the dipper ropes 251 and 252 being attached directly to the pivot point of the reversible dipper are ineffective to shift the dipper from one of its cutting positions to the other. To accomplish this shifting the reversing motor 260 is provided at the top of the handle 60, and is connected by suitable gearing 261 to the pulley 262 around which is passed the cable 170'. This cable is in a form of an endless belt and passes around the lower pulley 263 which is rigidly mounted upon the central portion of the dipper pivot shaft 77. It will be readily seen that actuation of the motor 260 in either direction will be effective to reverse the dipper. With this arrangement it is not necessary to provide latches for the dipper, since the pull of the ropes 251 and 252 do not have any tendency to reverse the dipper, and the cutting resistance is counteracted by the wing casting 74.

The several embodiments of the invention described herein and illustrated in the accompanying drawings are by way of example only, and it is conceivable that various changes may be made therein and still be within the scope of the invention as defined by the appended claims.

Having thus described the invention, what is claimed as new and desired to be secured by Letters Patent is:

1. In an excavator, in combination, a base, a boom comprising two parallel beams pivoted to said base, a boom extension provided with two parallel housings adapted to receive said beams, to constitute constant spacers between said beams and relieve said beams of horizontal and torsional strains, means disposed upon said boom extension for moving said boom extension in either direction relatively to said boom, supporting means connected to said extension, means for connecting said supporting means to said extension whereby free operation of said moving means is permitted, and digging means operatively connected to said boom extension.

2. In an excavator, in combination, a base, a boom pivotally connected to said base, a boom extension, supporting means connecting said extension to said base, a rack, disposed upon said boom, means upon said boom extension including a gear adapted to mesh with said rack for moving said boom extension along said boom, means operatively connecting said gear and said supporting means whereby the movement of said boom extension is not affected by said supporting means and digging means operatively connected to said boom extension.

3. In an excavator, in combination, a base, a boom pivoted to said base, a boom extension telescopically mounted upon said boom, a rack disposed upon said boom, means disposed upon said boom extension including a gear adapted to mesh with said rack for moving said boom extension along with said boom in order to increase the effective length of said boom, supporting means for said boom connected to said extension and intimately associated with said gear while having substantially no effect on the free rotation thereof, digging means operatively connected with said boom extension, and means for reversing the position of said digging means without detachment from the connection to said boom extension whereby, after digging in either direction, the digging member may discharge its contents above the ground level.

4. In an excavator, in combination, a base, a boom pivoted to said base, a boom extension telescopically mounted upon said boom, a rack disposed upon said boom, means disposed upon said boom extension including a motor and a gear driven thereby and adapted to mesh with said rack for moving said boom extension along said boom in order to increase the effective length of said boom, boom supporting means intimately associated with said gear, the tension in said supporting means being unaffected by said motor, and digging means operatively connected with said boom extension.

5. In an excavator, in combination, a base, a boom comprising two parallel beams pivoted to said base, a boom extension telescoping with said beams, racks on said beams, means including a motor and gears driven thereby for engaging the racks for moving the boom extension in either direction along the boom, digging means operatively connected to said boom, supporting means associated with said gears, and means operatively connecting said gears and said supporting means whereby the tension in said supporting means is unaffected by the cooperation of said motor and gears with said racks and supporting means.

6. In an excavator, in combination, a truck, a platform thereon rotatable upon a vertical axis, means for rotating said platform, a boom comprising two parallel beams pivoted to said base for vertical swinging movement, digging means operatively connected to said boom, a boom extension telescoping with said beams, racks on said beams, boom supporting means, means including a motor with gears and a drum driven thereby for engaging the racks for moving the boom extension in either direction along the boom, and for engaging the boom supporting means, and digging means operatively connected to said boom.

7. In an excavator, in combination, a base, a boom pivoted to said base, a rack on said boom, a boom extension, guying means connecting an upper portion of the base with the boom extension, and unitary means consisting of a motor, gears, and drum, mounted upon said boom extension and adapted to move said extension along the boom in a direction toward the pivot thereof and to simultaneously shorten the guying means in such a manner as to maintain the boom in a fixed position with respect to its pivot.

8. In an excavator, in combination, a base, a boom pivoted to said base, a rack on said boom, a boom extension, guying means connecting an upper portion of the base with the boom extension, and unitary means consisting of a motor, gears, and drum, mounted upon the boom extension for moving said extension along the boom in either direction and simultaneously varying the length of said guying means in such a manner as to maintain the boom in a fixed position with respect to its pivot.

9. In an excavator, in combination, a base, an extensible boom pivoted at its inner end to said base, boom supporting means connecting the outer end of said extensible boom with said base, independently actuable means for extending and retracting said boom and means associated with said boom supporting means and said extending and retracting means, and operative during said extension and retraction movements to automatically maintain said boom in a fixed angular position with relation to the pivot at its inner end.

10. In an excavator, in combination, a platform, a boom pivoted to said platform for vertical angular movement, a boom extension movable along said boom, flexible guying means operatively connecting said boom extension with said platform, means mounted upon said platform for varying the length of said flexible means to raise and lower the boom, and means mounted upon said boom extension for varying the length of said flexible means without affecting the position of the boom.

11. In an excavator, in combination, a platform, a boom pivoted to said platform for vertical angular movement, a boom extension, flexible guying means connecting said boom extension with said platform, a winding drum mounted on said platform and adapted to cooperate with said flexible guying means for raising and lowering said boom on its pivot, a winding drum mounted on said boom extension, and means associated with said last mentioned drum for moving said boom extension along the boom, whereby the length of the flexible guying means for any given angular position of said boom is varied at such a rate with respect to the rate of movement of the boom extension along the boom, as to maintain said given angular position of said boom.

12. In an excavator, in combination, a base, a horizontal boom connected thereto, a boom extension movable along said boom, flexible boom supporting means connecting the boom extension with the upper part of said base, digging means operatively connected to said boom extension, means for moving said boom extension together with said digging means along said boom, and means associated with said flexible boom supporting means and said moving means for automatically maintaining said boom in a fixed horizontal position during the movement of said boom extension.

13. In an excavator, in combination, a platform, a superstructure thereon, a boom pivoted to said platform for movement in a vertical plane and provided with a rack, a boom extension movable along said boom and provided with a gear operatively connected with said rack, flexible guying means connecting said boom extension with said superstructure, a winding drum for receiving said flexible means disposed upon said boom extension and fixed to said gear to rotate therewith, and means for simultaneously rotating said drum and gear whereby said boom extension is moved along said boom and said flexible means is wound up or paid out by said drum at such a rate with respect to the rate of movement of said boom extension as to maintain the position of said boom with respect to said platform.

14. In an excavator, a platform, a boom pivoted thereto, a superstructure on said platform, a boom extension movable along said boom, flexible boom supporting means connecting the boom extension with said superstructure, means for moving said extension along said boom, and a drum mounted on said boom extension and operatively connected with said boom extension moving means, one of said flexible means being connected to said drum at a point on its periphery and adapted to be wound thereon, the diameter of said drum progressively decreasing from the point of attachment of said flexible means as said means is wound thereon.

15. In an excavator, a platform, a boom pivoted thereto, a superstructure on said platform, a boom extension movable along said boom, flexible boom supporting means connecting the boom extension with said superstructure, means for moving said extension along said boom, and a drum mounted on said boom extension and operatively connected with said boom extension moving means, one of said flexible means being connected to said drum at a point on its periphery and adapted to be wound thereon, the diameter of said drum at any point of tangency of its periphery and said flexible means during rotation thereof being a function of the cosine of the angle included between the flexible means and the boom.

16. In an excavator, in combination, a platform, a superstructure thereon, a boom pivoted to said platform for movement in a vertical plane, said boom comprising two parallel beams provided with racks, a boom extension movable along said boom and provided with two gears operatively connected with said racks, flexible boom supporting means connecting said boom extension with said superstructure, and a winding drum mounted on said boom extension disposed between said gears and rigidly connected thereto, one end of said flexible means being connected to said drum and adapted to be wound thereon, the diameter of said drum progressively decreasing from the point of attachment of said flexible means.

17. In an excavator, in combination, a base, a superstructure thereon, a boom pivoted to said base, a drum mounted on said boom, and flexible connecting means disposed between said boom and said superstructure for supporting said boom and adapted to be wound upon said drum, the diameter of said drum at each successive point of tangency of said connecting means varying as the cosine of the angle between said connecting means and said boom.

18. In an excavator, in combination, a platform, a superstructure thereon, a boom pivoted to said platform for movement in a vertical plane and provided with a rack, a boom extension movable along said boom, flexible boom supporting means connecting said superstructure and said boom extension, a gear on said boom extension adapted to operatively engage said rack, and a winding drum on said boom extension fixed to said gear and disposed coaxially therewith, said flexible means being attached to said drum and adapted to be wound thereon, the diameter of said drum at any given point of tangency of said flexible means with the circumference of said drum being the product of the diameter of the pitch circle of the gear and the cosine of the angle included between said flexible means and said boom from said given point of tangency, whereby the force required to wind said flexible means upon said drum and to move said gear along said rack is unaffected by the tension in said flexible means.

19. In an excavator, in combination, a pivoted boom, a boom extension, a pivot member mounted upon said boom extension for movement in a vertical plane, a dipper handle operatively connected to said pivot member for axial translational movement, and cables operatively connected to said handle and said boom extension to effect either of said movements in either direction, said cables being adapted to travel in unison with said boom extension.

20. In an excavator, in combination, a pivoted boom, a boom extension, a pivot member mounted on said boom extension for movement in a vertical plane, a dipper handle having a connection with said pivot member permitting axial translational movement thereof, locking means for said handle to prevent translational movement while permitting pivotal movement, cables for effecting forward pivotal movement of said handle, cables for effecting rearward pivotal movement of said handle, and means for simultaneously actuating all of said cables to effect said translational movement when said locking means is unlocked, said cables and locking means together with said extension adapted to move in unison along the boom without effecting the translation and pivotal movements of the handle or the movement of the boom about its pivot.

21. In an excavator, in combination, a pivoted boom, a boom extension, a pivot member mounted on said boom extension for movement in a vertical plane, a dipper handle having a connection with said pivot member permitting axial translational movement thereof, electro-magnetically operating and locking means for said handle, a cable for effecting forward pivotal movement of said handle, a cable for effecting rearward pivotal movement of said handle, and means for simultaneously actuating all of said cables to effect said translational movement when said locking means is unlocked, said cables and locking means together with said extension adapted to move in unison along the boom without effecting the translational or pivotal movements of said handle or boom.

22. In an excavator, in combination, a boom, a dipper handle operatively connected with said boom for forward and rearward pivotal movement relative thereto, cables for effecting said forward movement, cables for effecting said rearward movement, a reversible digging dipper disposed at the lower end of said handle, and a latch to hold said dipper in either of its digging positions, said cables being connected to said dipper whereby they may effect reversal of said dipper when said latch is released.

23. In an excavator, in combination, a movable truck, a horizontally rotating platform, operating means mounted thereon, a boom pivoted to said platform for movement in a vertical plane, a boom extension movable along said boom, a dipper handle operatively connected with said boom extension for pivotal movement and adapted to be raised and lowered relatively to said boom extension, and a dipper with separate forward and backward cutting edges and openings, connected to said handle and adapted to cut forwardly and backwardly and to dump its contents above the cutting level at the end of each forward or backward stroke, a motor and gears mounted on said extension for moving the same, cables attached, through the medium of said dipper, to the handle and operatively connected with said extension for effecting said raising, lowering, and pivotal movements of said handle, said cables adapted to effect the reversal of said dipper without detachment of the dipper from the handle or cables.

24. In an excavator, in combination, a pivoted boom, a boom extension, a dipper handle mounted on said boom extension for pivotal and sliding movement, means for locking said dipper handle in any of its positions relative to said boom extension, and means for moving said boom extension along said boom, without affecting the angular position of said boom.

25. In an excavator, in combination, a pivoted boom, a boom extension, a dipper handle mounted on said boom extension for pivotal and sliding movement, means for locking said dipper handle in any of its positions relative to said boom extension, a dipper reversible without detachment mounted upon the lower end of said handle, and means for moving said boom extension along said boom, without affecting the angular position of said boom.

26. In an excavator, in combination, a base, a superstructure thereon, a boom pivoted to said base, a boom extension, flexible boom supporting means connecting said boom extension with said superstructure, means mounted on said boom extension for varying the length of said boom supporting means whereby the position of said boom relative to said base is maintained during said variation in length of said supporting means, means mounted on the base for varying the length of said boom supporting means and thereby changing the position of said boom relative to said base, a dipper handle mounted on said boom extension for pivotal and sliding movement, means for locking said dipper handle in any of its positions relative to said boom extension, means for moving said boom extension along the boom, and means whereby the position of said boom relative to said base is maintained during movement of said boom extension, and a dipper operatively connected to said handle.

27. In an excavator, in combination, a base, a superstructure thereon, a boom pivoted to said base, a boom extension, flexible boom supporting means connecting said boom extension with said superstructure, a dipper handle mounted on said boom extension for pivotal and sliding movement, electro-magnetically actuated means for locking said dipper handle in any of its positions relative to said boom extension, means for moving said boom extension along the boom, means mounted on said boom extension whereby the position of said boom relative to said base is maintained during movement of said boom extension, means mounted on said base for effecting changes in the relative position of said boom and said base, and a dipper operatively connected to said handle, means for positively reversing the cutting position of said dipper without detachment thereof from said handle.

28. In an excavator, in combination, a base, a boom pivoted thereto, a boom extension, a dipper handle mounted upon said boom extension for forward and rearward pivotal movement, separate flexible means in operative contact with said extension but out of contact with said boom for moving said handle forwardly and rearwardly, separate winding means for each of said flexible means mounted upon said base, and means for actuating said winding means singly or in unison.

29. In an excavator, in combination, a base, a boom pivoted thereto, a dipper handle mounted upon said boom for forward and rearward pivotal movement and for translational movement, separate flexible means for moving said handle forwardly, rearwardly, and translationally, separate winding means for each of said flexible means mounted upon said base, means for actuating said winding means singly or in unison, consisting of separate counterbalances and cables connected with said winding means, said counterbalances being in equal opposition to each other and without affecting the net difference in tension between the said separate flexible means during said movements of said handle, whereby slack is absorbed, and the net live load is not increased, in said flexible means.

30. In an excavator, in combination, a base, a boom pivoted thereto, a boom extension, a dipper handle mounted upon said boom extension for forward and rearward pivotal movement, means permitting translatory movement of said handle along the line of its axis, separate cables for moving said handle forwardly and rearwardly, means for actuating said cables singly, reversibly, or in unison, and means on said boom extension for selectively locking each of said cables and said translatory movement permitting means or all of them simultaneously.

31. In an excavator, in combination, a base, a boom pivoted thereto, a movable boom extension, a dipper handle mounted upon said boom extension for forward and rearward pivotal movement, separate flexible means for moving said handle forwardly and rearwardly, separate, independently reversible winding means for each of said flexible means mounted upon said base, uniting driving means for said winding means, and selectively actuated clutch devices for operatively connecting said winding means to said driving means, said winding means adapted to be rotated simultaneously in either the same or opposite directions, or either to be held while the other is rotated, and clutch means for selectively locking said flexible means to said boom extension.

32. In an excavator, in combination, a base, a boom pivoted thereto, a boom extension, a dipper handle mounted upon said boom extension for forward and rearward pivotal movement, and for translatory movement along the line of the axis of said handle, separate flexible means for moving said handle forwardly and rearwardly, means for effecting vertical adjustment of said handle by simultaneous actuation of both of said flexible means, a dipper on the lower end of said handle, and means for moving said boom extension along said boom to effect cuts by said dipper parallel to said boom and of varying depth, without changing the position of said boom relative to said base.

33. In an excavator, in combination, a base, a boom pivoted to said base for movement in a vertical plane, a boom extension mounted on said boom, a superstructure on said base, flexible boom supporting means connecting said superstructure and said boom extension, a reversible dipper and handle for arcuate cutting, means for moving said boom extension along said boom without changing the position of said boom relatively to said base, and a supporting wheel carried by said boom extension, said wheel adapted to relieve said flexible boom supporting means and to resist the downward pull of said dipper when it is cutting upwardly in an arcuate path.

34. In an excavator, in combination, a base, a boom pivoted thereto, a boom extension movable along said boom, a dipper handle mounted on said boom extension for pivotal movement and for translational movement along the line of the axis of said handle, flexible means for effecting said pivotal movement, and means for effecting said translational movement including a motor and gearing disposed upon said boom extension.

35. In an excavator, in combination, a base, a boom pivoted thereto, a boom extension movable along said boom, a dipper handle operatively connected to said boom extension for pivotal movement and for translational movement along the line of the axis of said handle, and means for alternatively effecting said pivotal movement and said translational movement including a motor and gearing disposed upon said boom extension.

36. In an excavator, in combination, a base, a boom pivoted to said base, a dipper handle pivoted to said boom, a dipper pivoted to the lower end of said handle, cables attached directly to said dipper pivot without the interposition of bails or sheaves for effecting pivotal movement of said handle, whereby said dipper may approach said boom in the rearwardly pivoted position of said handle near enough to dump its contents at a considerable height above the unexcavated ground level.

37. In an excavator, in combination, a base, a boom pivoted to said base, a dipper handle pivoted to said boom for forward and rearward movement, an excavating dipper pivoted at the lower end of said handle, a pair of cables attached to said dipper pivot for effecting forward movement thereof, a pair of cables attached to said dipper pivot for effecting rearward movement thereof, winding drums mounted on said base, cables operatively connected to said winding drums, and equalizing means connecting each of said drum connected cables with one of said pairs of dipper moving cables.

38. In an excavator, in combination, a base, a boom extending therefrom, a boom extension movable along said boom, electrically operated devices carried by said boom extension, a source of electrical energy associated with said base, a rotatable counter-balanced drum mounted on said base, an electrical contact rotatable with said drum, a stationary contact mounted on said base and connected with said source of energy, and a flexible conduit having one end secured to said movable extension and the other end connected to said rotatable contact, said conduit adapted to be wound upon and unwound from said drum as said boom extension moves along said boom.

39. In an excavator, in combination, a base, a boom extending from said base, a boom extension movable along said boom, electrically operated devices carried by said boom extension, a plurality of stationary brushes mounted on said base, connected with a source of electrical energy, a rotatable counter-balanced drum mounted on said base and provided with a plurality of collector rings rotatable with said drum and adapted to continuously contact with said brushes, a flexible multi-strand cable having one end secured to said movable boom extension and the several strands at the other end connected respectively to said collector rings, said cable adapted to be wound upon and unwound from said drum as said boom extension moves in either direction along said boom.

40. In an excavator, in combination, a base provided with a superstructure, a boom pivotally connected to said base, a boom extension mounted on said boom, means for moving said boom extension, flexible supporting means for said boom and extension connecting said extension with said superstructure, means on said extension associated with said moving means for varying the length of said flexible support without changing the relative position of said boom with respect to said base, separate means on the base for varying the length of said flexible support and thereby to change the relative position of said boom with respect to said base, said support varying means being adapted to operate either separately or simultaneously, a dipper handle mounted on said boom extension adapted for pivotal or translational movement and provided at its lower end with a pivoted reversible dipper having separate cutting openings adapted for forward and rearward digging without detachment from its pivot, whereby the lower portion of said handle operates alternately as a closure for either opening of the dipper which is not employed in digging, means mounted on said base and flexibly connected through said extension to said dipper for selectively reversing the dipper and causing it to cut forwardly and rearwardly, said digging means adapted to be projected forwardly beyond the end of said boom in any position to which said extension may be moved by said extension moving means along the axis of the boom.

41. In an excavator, in combination, a base, a boom pivoted to said base, a boom extension mounted on said boom, digging elements associated with said boom extension and adapted to be extended beyond the forward end of said boom in any position of said extension, boom supporting means connecting said boom extension with said base, means for moving said boom extension along said boom, and means associated with said boom supporting means and said moving means for automatically maintaining the boom in a given angular position with respect to said base without opposition or assistance from said supporting means.

42. In an excavator, in combination, a base, a boom pivoted to said base, a rack on said boom, a boom extension, guying means connecting an upper portion of the base with the boom extension, and unitary means including gears adapted to mesh with said rack mounted upon said boom extension and adapted to move said extension along the boom in a direction toward the pivot thereof and to simultaneously shorten the guying means in such a manner as to maintain the boom in a fixed position with respect to its pivot.

43. In an excavator, in combination, a base, a boom pivoted to said base, a rack on said boom, a boom extension, guying means connecting an upper portion of the base with the boom extension, and unitary means including gears adapted to mesh with said rack mounted upon the boom extension for moving said extension along the boom in either direction and simultaneously varying the length of said guying means in such a manner as to maintain the boom in a fixed position with respect to its pivot.

44. In an excavator, in combination, a boom, a dipper handle operatively connected to said boom for pivotal movement in a vertical plane, a reversible dipper pivotally connected to the lower end of said handle and provided with a plurality of digging edges, a cable operatively connected with said handle through the medium of said dipper, means for controlling said cable so as to effect said pivotal movement of said handle and the reversal of said dipper about the lower end of said handle to effect the operative engagement of different cutting edges and the discharge of the contents of said dipper without detaching said dipper from said handle and cables.

45. In an excavator, in combination, an operating platform, a superstructure thereon, a vertically disposed frame pivotally connected to said platform and to said superstructure for horizontal movement, an extensible boom pivoted at its inner end to said frame at the lower end thereof for movement in a vertical plane, boom supporting means connecting the outer end of said extensible boom with the upper portion of said frame, independently actuable means for extending and retracting said boom and means associated with said boom supporting means and said extending and retracting means, and operative during said extension and retraction movements to automatically maintain said boom in a fixed angular position with relation to the pivot at its inner end, a dipper handle carried by said extension ropes for controlling the movement of said dipper handle, mechanism mounted upon said platform for actuating said ropes and boom supporting means, sheaves for said ropes and for said boom supporting means disposed upon said frame and said superstructure in such relative positions that movement of said ropes and boom supporting means around said sheaves is permitted regardless of the horizontal angular movement of said frame with respect to said platform.

46. In an excavator, in combination, a base, a boom pivoted thereto, a movable boom extension, a dipper handle mounted upon said boom extension for forward and rearward pivotal movement with respect to said extension and translatory movement along the line of its axis, separate cables for moving said handle forwardly and rearwardly, independent selective means for actuating said cables singly, reversibly, or in unison, clutches carried by said extension operating directly upon said cables, and locking means for preventing translatory movement of said handle also carried by said extension, whereby either of said cables or the translatory movement of the handle, or all of them simultaneously, may be locked against movement.

47. In an excavator, in combination, a base, a boom pivoted to said base, a traveling boom extension mounted on said boom and adapted to be extended forwardly beyond the front end of said boom or to be retracted rearwardly of the front end of said boom, digging elements comprising a dipper and an oscillating handle therefor associated with said boom extension and adapted to be extended beyond the forward end of said boom in any selected operating position of said extension, boom supporting means connecting said boom extension with said base, means for actuating said boom supporting means to pivot said boom with respect to said base, and means associated with said extension and with said supporting means for effecting the free travel of said extension along said boom in said chosen operating position independently of said pivoting means.

JOHN D. PUGH.